(12) United States Patent
Almadani et al.

(10) Patent No.: US 10,599,110 B2
(45) Date of Patent: *Mar. 24, 2020

(54) GLOVE SYSTEM FOR REMOTE CONTROL OF INDUSTRIAL MACHINES

(71) Applicant: KING FAHD UNIVERSITY OF PETROLEUM AND MINERALS, Dhahran (SA)

(72) Inventors: Basem Mohammed Almadani, Dhahran (SA); Farouq Muhammad Aliyu, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 16/362,178

(22) Filed: Mar. 22, 2019

(65) Prior Publication Data
US 2019/0219974 A1 Jul. 18, 2019

Related U.S. Application Data

(63) Continuation of application No. 15/000,726, filed on Jan. 19, 2016, now Pat. No. 10,295,971.

(51) Int. Cl.
*G05B 11/01* (2006.01)
*G05B 15/02* (2006.01)
*G06F 3/01* (2006.01)

(52) U.S. Cl.
CPC ............ *G05B 15/02* (2013.01); *G06F 3/014* (2013.01); *G06F 3/017* (2013.01)

(58) Field of Classification Search
CPC .......... G05B 15/02; G06F 3/014; G06F 3/017
(Continued)

(56) References Cited

U.S. PATENT DOCUMENTS 4,972,074 A 11/1990 Wright
4,988,981 A 1/1991 Zimmerman et al.
(Continued)

FOREIGN PATENT DOCUMENTS

WO WO 2014/082171 A1 6/2014

OTHER PUBLICATIONS

L.Dipietro, et al., "A Survey of Glove-Based Systems and Their Applications", IEEE Transactions on Systems, Man, and Cybernetics—Part C: Applications and Reviews, vol. 38, No. 4, Jul. 2008, pp. 461-482.
(Continued)

*Primary Examiner* — Connie C Yoha
(74) *Attorney, Agent, or Firm* — Oblon, McClelland, Maier & Neustadt, L.L.P.

(57) ABSTRACT

A wearable embedded control system, including at least one remote device and at least one wearable hand device. The wearable hand device includes a plurality of light emitting diodes coupled to a plurality of light dependent resistors wherein the light emitting diodes and the light dependent resistors are fixed along at least one finger of the wearable hand device. The wearable hand device further includes a signal conditioning circuit configured to filter an ambient light signal, and a single board computer including processing circuitry configured to detect a presence of light emitted by the plurality of light emitting diodes and received by the plurality of light dependent resistors, determine one or more integer values corresponding to the presence of light received by the plurality of light dependent resistors, and transmit the one or more integer values to the remote device via a real-time Data Distribution Service middleware.

7 Claims, 7 Drawing Sheets

(58) Field of Classification Search
USPC .................................................... 700/17, 19
See application file for complete search history.

(56) References Cited

U.S. PATENT DOCUMENTS

| | | | |
|---|---|---|---|
| 5,184,009 | A | 2/1993 | Wright |
| 9,148,931 | B2 | 9/2015 | Valenti |
| 9,538,612 | B1 | 1/2017 | Reed |
| 9,746,921 | B2 | 8/2017 | Mallinson |
| 10,295,971 | B2 * | 5/2019 | Almadani .............. G05B 15/02 |
| 2012/0242800 | A1 | 9/2012 | Ionescu |
| 2013/0162520 | A1 | 6/2013 | Kettle |
| 2013/0197399 | A1 | 8/2013 | Montgomery |
| 2016/0364010 | A1 | 12/2016 | Amma |

OTHER PUBLICATIONS

L.Simone et al., "Design considerations for a wearable monitor to measure finger posture", Journal of Neuroengineering and Rehabilitation, Mar. 2005, pp. 1-10.

Wikipedia, https://en.wikipedia.org/wiki/Data_Distribution_Service.

* cited by examiner

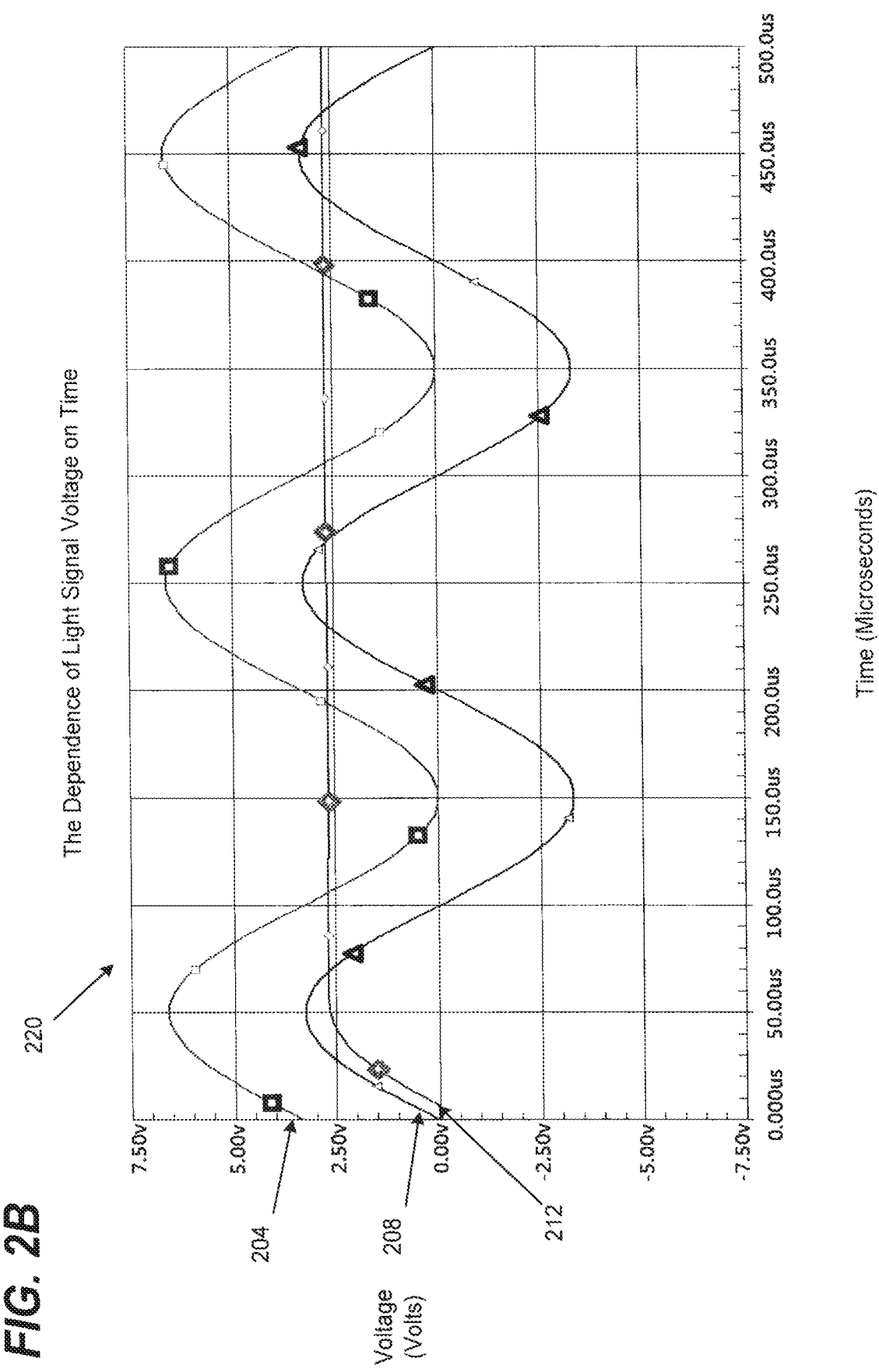

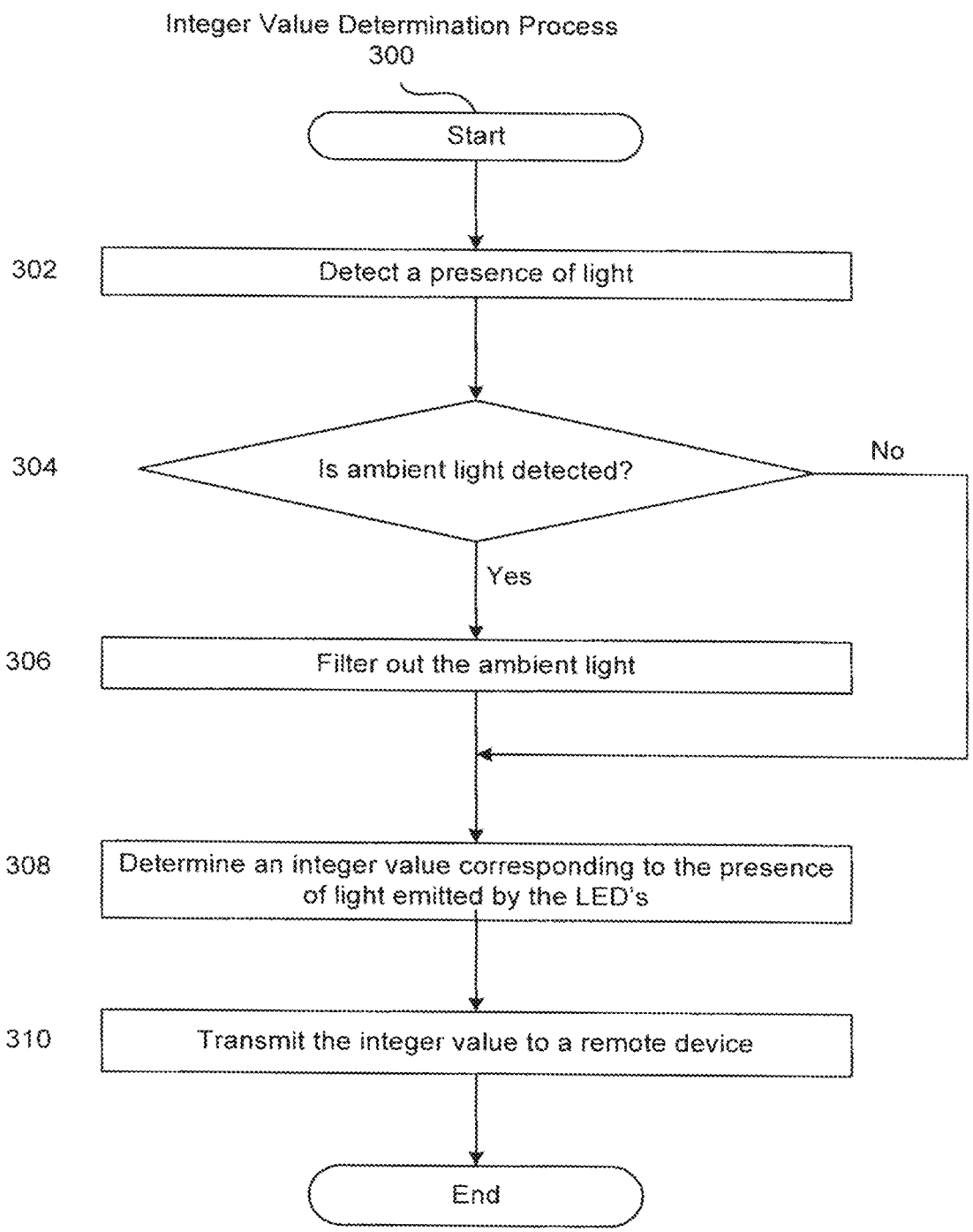

GLOVE SYSTEM FOR REMOTE CONTROL OF INDUSTRIAL MACHINES

CROSS-REFERENCE TO RELATED APPLICATIONS

The present application is a Continuation of Ser. No. 15/000,726, having a filing date of Jan. 19, 2016, now allowed.

BACKGROUND

The "background" description provided herein is for the purpose of generally presenting the context of the disclosure. Work of the presently named inventor, to the extent it is described in this background section, as well as aspects of the description which may not otherwise qualify as prior art at the time of filing, are neither expressly nor impliedly admitted as prior art against the present disclosure.

Remotely controlling industrial machines and/or actuators with precision and speed has been a vibrant area of research. The wired interconnection of controllers and actuators is expensive and requires enormous manpower during installation and/or removal. Wireless communication systems can lower installation and/or removal costs as well as increase portability of the system as a whole. However, the development of a wireless communication system must strike a balance between portability and performance in order to be considered preferential to a wired communication system.

SUMMARY

In an exemplary aspect, a wearable embedded control system, including at least one remote device and at least one wearable hand device. The wearable hand device includes a plurality of light emitting diodes coupled to a plurality of light dependent resistors wherein the light emitting diodes and the light dependent resistors are fixed along at least one finger of the wearable hand device. The wearable hand device further includes a signal conditioning circuit configured to filter an ambient light signal, and a single board computer including processing circuitry configured to detect a presence of light emitted by the plurality of light emitting diodes and received by the plurality of light dependent resistors, determine one or more integer values corresponding to the presence of light received by the plurality of light dependent resistors, and transmit the one or more integer values to the remote device via a real-time Data Distribution Service middleware.

The foregoing general description of exemplary implementations and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein:

FIG. 2B is an exemplary graphical representation of signal conditioning, according to certain embodiments;

FIG. 3 is an algorithmic flowchart of an integer value determination process, according to certain embodiments;

DETAILED DESCRIPTION

Figure 1:
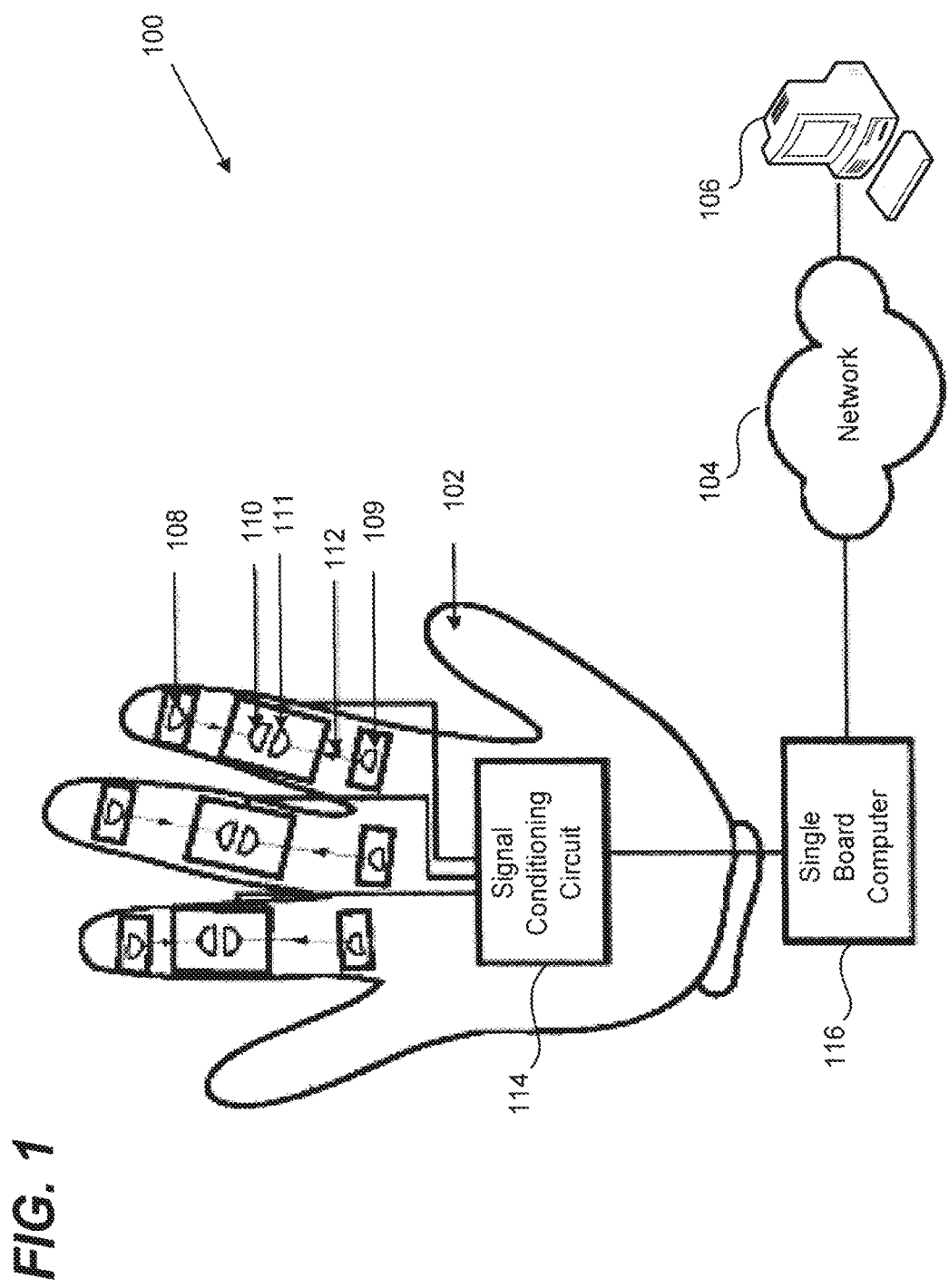
FIG. 1 is an exemplary illustration of a wearable embedded control system, according to certain embodiments.

In the drawings, like reference numerals designate identical or corresponding parts throughout the several views. Further, as used herein, the words "a" "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

FIG. 1 is an exemplary illustration of a wearable embedded control system 100, according to certain embodiments. The wearable embedded control system 100 includes a wearable hand device 102, a network 104 and a remote device 106. The wearable hand device 102 represents one or more wearable hand devices 102 and is connected to the remote device 106 via the network 104. The wearable hand device 102 can include a glove, a gadget glove, a wearable hand exoskeleton, or any other wearable hand input device that is known.

In certain aspects of the present disclosure, the wearable hand device 102 includes a plurality of light emitting diodes (LEDs) 108 and 109 and a plurality of light dependent resistors (LDRs) 110 and 111 coupled to the plurality of LEDS. The LEDs 108 and 109 are configured to emit light 112 in the direction of corresponding LDRs 110 and 111. The LDRs 110 and 111 are configured to receive the light emitted 112 by the corresponding LEDS 108 and 109. Due to the rectilinear propagation of light, the light emitted by each LED 108 and 109 falls on the LDR 110 and 111 the LEDs 108 and 109 are coupled to.

In certain embodiments, two LEDs 108 and 109 and two LDRs 110 and 111 are fixed along a finger of the wearable hand device 102. Each of the LEDs 108 and 109 are coupled to a LDR 110 and 111, thereby creating a first LED-LDR pair and a second LED-LDR pair.

In certain aspects of the present disclosure, the LEDs 108 and 109 and the LDRs 110 and 111 are housed in a cylindrical container. Each cylindrical container can house a single LED 108 and 109 or LDR 110 and 111. The cylindrical containers direct the light emitted by the LEDs 108 and 109 towards the corresponding LDRs 110 and 111 and hinder ambient light from being received by the LDRs 110 and 111. The two LED-LDR pairs are fixed along at least one finger of the wearable hand device 102. For example, a first LED 108 can be fixed at the distal end of the finger, directed down the length of the finger. The first LED 108 can be directed towards a first LDR 110 and fixed at the middle of the finger, thereby creating the first LED-LDR pair. A second LED 109 can be fixed at the proximal end of the finger, directed up the length of the finger. The second LED 109 can be directed towards a second LDR 111 fixed at the middle of the finger and beneath the first LDR 110, thereby creating the second LED-LDR pair. In certain aspects of the present disclosure, there may be more than two LED-LDR pairs fixed at a finger of the wearable hand device 102. The LED-LDR pairs can be fixed at one or more fingers of the wearable hand device 102. The LED-LDR pairs can be fixed at the wearable hand device 102 on the anterior side of the wearable hand device 102, the posterior side of the wearable hand device 102, or both.

The wearable hand device 102 further includes a signal conditioning circuit 114. The signal conditioning circuit 114 optimizes the light signal corresponding to the presence of light received by the LDRs 110 and 111. As such, the signal conditioning circuit 114 can be configured to filter out ambient light signals passed by the LDRs 110 and 111. The signal conditioning circuit 114 can include a coupling capacitor, a rectifying diode and a Schmitt Trigger. The coupling capacitor removes undesirable ambient light from the light received by the LDRs 110 and 111. The rectifying diode is used with the coupling capacitor to further smooth and filter the light signal corresponding to the light received by the LDRs 110 and 111. The Schmitt Trigger further removes noise from the light signal as well as converts the light signal to a low powered signal which can be read by the single board computer 116. The signal conditioning circuit 114 can include any other combinations of capacitors, diodes, resistors, components and the like that is known. The functions of the signal conditioning circuit 114 will be discussed further herein.

The wearable hand device 102 further includes a single board computer 116. The single board computer 116 includes processing circuitry which can be configured to pulse the emission of light of the LEDs 108 and 109 by switching the LEDs 108 and 109 ON and OFF. The pulsing of the LEDs 108 and 109 can isolate the LED light emission to predetermined points in time. As such, the processing circuitry can aid in the filtering of ambient light due to the modulation of the LED emitted light. The processing circuitry can switch the LEDs 108 and 109 ON and OFF at a fixed frequency such as 1 kHz, 5 kHz, 10 kHz and the like. The processing circuitry can also switch the LEDs 108 and 109 ON and OFF at varying frequencies based on the time of day, the amount of ambient light present, the total number of LEDs 108 and 109, and the like. In certain embodiments, the processing circuitry switches the LEDs 108 and 109 ON and OFF at a frequency of 5 kHz such that the LDRs 110 and 111 receive the light emitted by the LEDs 108 and 109 and pulse every second indicating that the processing circuitry is detecting the presence of non-ambient light. In certain aspects of the present disclosure, the signal conditioning circuit 114 is configured to filter out the pulse signals from the input light signal. In certain embodiments, the processing circuitry is configured to leave the LEDs 108 and 109 in the ON state as long as power is present.

The processing circuitry is further configured to take the light signal as an input from the signal conditioning circuit 114. The processing circuitry can be configured to detect a presence of light emitted by the LEDs 108 and 109 and received by the LDRs 110 and 111. The processing circuitry takes in the light signal as one bit corresponding to each LDR 110 and 111 and determines if the LED 108 and 109 emitted light is present at each LDR 110 and 111. The processing circuitry determines quantized movement of the wearable hand device 102. As such, each movement of the wearable hand device 102 can be represented by a combination of ones and zeroes corresponding to the light received by each LDR 110 and III.

The processing circuitry can be further configured to determine one or more integer values corresponding to the detection of light emitted by the LEDs 108 and 109. For example, in a wearable hand device 102 with a first LED-LDR pair and a second LED-LDR pair, the processing circuitry can be configured to determine an integer equivalent of "0" if no light is detected at either LED-LDR pair, an integer equivalent of "1" if light is detected at the first LED-LDR pair and light is not detected at the second LED-LDR pair, an integer equivalent of "2" if light is not detected at the first LED-LDR pair but light is detected at the second LED-LDR pair, and an integer equivalent of "3" if light is detected at the first LED-LDR pair and light is detected at the second LED-LDR pair. The processing circuitry is further configured to transmit the determined integer values to the remote device 106 via the network 104.

The processing circuitry can be further configured to determine commands to actuate the remote device 106 based on the integer values. For example, if there are two LED-LDR pairs fixed at the wearable hand device 102, then there will be a total of four different integer values (if the total number of LED-LDR pairs is represented by "N," then the total number of possible integer values will be equal to 2^N). The processing circuitry can assign a different command to each possible integer value. As such, the processing circuitry can be configured to actuate the remote device 106 directly by commanding the remote device 106 to actuate in a specific way through the detection of light emitted by the LEDs 108 and 109 at the wearable hand device 102.

The processing circuitry is further configured to publish the determined integer values and commands via a real-time Data Distribution Service middleware. The Data Distribution Service (DDS) middleware provides smooth, wireless communication between a variety of different components. The DDS middleware corresponds to a real-time publish and subscribe protocol in a distributed system, such as the wearable embedded control system 100. The processing circuitry of single board computer 116 can be configured to publish the determined integer values and commands. The remote device 106 can be configured to subscribe to the wearable hand device 102 in which the remote device 106 would receive the integer values and commands from the processing circuitry over a real-time DDS middleware via the network 104.

In certain aspects of the present disclosure, the wearable hand device 102 corresponds to a glove that can preferably be made of a high molecular weight polyethylene base material and/or an ultra-high molecular weight polyethylene base material that fully covers palmer and dorsal surfaces of a human hand comprising four fingers cavities, a thumb cavity, a palm, a back of a hand, and a wrist. This HMWPE and/or UHMWPE layer, or base material, is flexible and has strong puncture-resistant characteristics, acting primarily as a protective barrier. In addition, the base material can further contain other additives in addition to the principal component described above. The other additive is exemplified by a plasticizer, a stabilizer, a thickening agent, and the like. The HMWPE and/or UHMWPE material can refer to material that has been processed by a variety of methods. Furthermore HMWPE and/or UHMWPE may refer to material that has been crosslinked, or that has not been crosslinked.

The body of the wearable hand device 102 can include a main body portion for covering a main body of a hand of a wearer, including the back of the hand, and palm regions. The wearable hand device 102 can also include extended cavities, or cylindrical cavities, extending out from the main body portion comprising a thumb cavity, an index finger cavity, a middle finger cavity, a ring finger cavity, and a pinky finger cavity, for covering these parts of the wearer's hand. The cavities can be cylindrical in shape having fingertip portions that are closed or sealed. The wearable hand device 102 can include a cylindrical portion for covering the wearer's wrist. The cylindrical portion can extend from the main body, opposite of the extending finger cavities. This cylindrical wrist covering portion can have an opening into which the wearer can insert his/her hand and is optionally formed in a cylindrical shape such that the opening diameter gradually increases toward the opened edge. This cylindrical wrist covering portion can also contain an elastic or stretchable band.

The network 104 represents one or more networks 104, such as the Internet, and is connected to the wearable hand device 102 and the remote device 106. The network 104 may communicate via wireless networks such as Wi-Fi, Bluetooth, cellular networks including EDGE, 3G and 4G wireless cellular systems, or any other wireless form of communication that is known.

The remote device 106 represents one or more remote devices 106 and is connected to the wearable hand device 102 via the network 104. The remote device 106 can be a computer, an industrial device, an actuator, or any other device that can translate the integer values and/or commands into actions. The remote device 106 is configured to receive the integer values and/or commands from the processing circuitry of the single board computer 116 embedded in the wearable hand device 102. In certain aspects of the present disclosure, the remote device 106 receives integer values from the processing circuitry, translates the integer values into commands, and performs actions at the remote device 106 corresponding to the commands. For example, the processing circuitry can determine an integer value of "1" when only one of the LDRs 110 receives light emitted by the corresponding LED 108 that the LDR 110 is coupled to. The processing circuitry transmits the integer value of "1" to the remote device 106 via the network 104. The integer value "1" is translated by the remote device 106 into a corresponding command which actuates the remote device 106 to perform a particular action.

In some embodiments, the remote device 106 receives commands from the processing circuitry and performs actions at the remote device corresponding to the commands. For example, the processing circuitry can determine an integer value of "1" when one of the LDRs 110 detects light emitted by the corresponding LED 108 that the LDR 110 is coupled to. The integer value of "1" is detected to be a command by the processing circuitry. The processing circuitry can access the command via a lookup table stored in memory of the single board computer 116. The lookup table can include the integer values corresponding to one or more commands. In an example, the accessed command corresponding to the integer value of "1" can be "Turn On." The command is transmitted to the remote device 106 via the network 104. The "Turn On" command is received by the remote device 106 and the remote device 106 is actuated to perform the command.

Figure 2A:
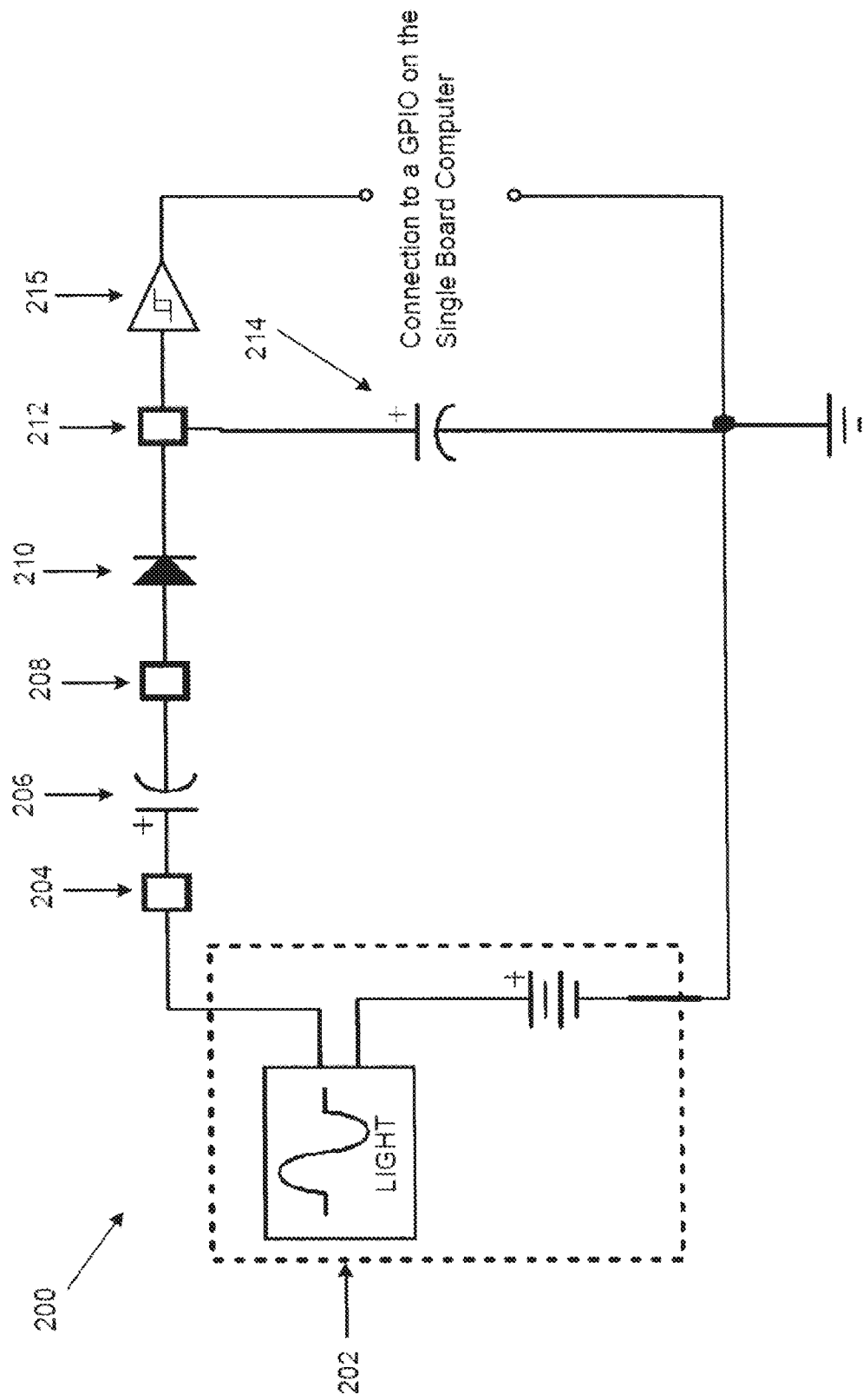
FIG. 2A is an exemplary illustration of a signal conditioning circuit, according to certain embodiments.

FIG. 2A is an exemplary illustration of a signal conditioning circuit 200, according to certain embodiments. The signal conditioning circuit 200 can include a light signal 202, a coupling capacitor 206, a rectifying diode 210, a filtering capacitor 214 and a Schmitt Trigger 215. Light is received via the LDRs 110 and 111 as an input and a light signal 202 is formed from the received light. The light signal 202 is output from the LDRs 110 and 111 to the signal conditioning circuit 200. The light signal 202 can include light emitted by the LEDs 108 and 109 as well as ambient light. At point 204 in the signal conditioning circuit 200, the light signal 202 is unfiltered and includes all light received by the LDRs 110 and 111 such as ambient light and LED light. The light signal 200 at point 204 is then passed through the coupling capacitor 206 and undesirable ambient light is filtered out of the light signal 204. The coupling capacitor 206 effectively removes the DC component of the light signal 202.

At point 208 in the signal conditioning circuit 200 the light signal 202 is devoid of any DC component which is formed as a result of the ambient light. The light signal 202 at point 208 is passed through the rectifying diode 210. The rectifying diode 210 changes the AC component of the light signal 220 to DC. At point 212, the light signal 202 is conditioned by both the coupling capacitor 206 and the rectifier diode 210. The light signal 202 at point 212 is passed through the filtering capacitor 214 for smoothing. The light signal 202 is then passed through a Schmitt Trigger 215 for regulation. The Schmitt Trigger 215 is utilized to remove any remaining noise from the light signal 202. Additionally, the Schmitt Trigger 215 is utilized to convert the light signal 202 to a low powered DC signal to be read as an input by the single board computer 116.

FIG. 2B is an exemplary graphical representation of signal conditioning 220, according to certain embodiments. The graphical representation of signal conditioning 220 illustrates the filtering of ambient light via the signal conditioning circuit 200. The graphical representation of signal conditioning 220 includes the light signal 202 at various points in the signal conditioning circuit 200.

The light signal 202 at point 204 is an unfiltered light signal 202. The unfiltered light signal 202 can include ambient light and light emitted by the LEDs 108 and 109. The unfiltered light signal 202 can include a DC offset due to the undesirable ambient light. In certain aspects of the present disclosure, the graphical representation of point 204 includes a sinusoidal curve corresponding to the light signal 202 at the input of the signal conditioning circuit 200.

The light signal 202 at point 208 represents the light signal 202 after it has been filtered by the coupling capacitor 206. At the curve corresponding to point 208, the DC offset of the light signal 202 has been removed. The light signal 202 is filtered and only contains the sinusoidal signal which is unusable by the single board computer 116. As such, the light signal 202 can be further conditioned.

The light signal 202 at point 212 represents the light signal after it has been passed through the rectifying diode 210 and the filtering capacitor 214. At the curve corresponding to point 212, the light signal 202 is smoothed. The rectifying diode 210 changes the AC component of the light signal 202 to DC. The filtering capacitor 214 further smoothens the DC signal. The light signal 202 can now be passed through the Schmitt-Trigger 215 to convert the light signal 202 to a low powered steady DC signal to be read as an input by the single board computer 116.

FIG. 3 is an algorithmic flowchart of an integer value determination process 300, according to certain embodiments. The integer value determination process 300 uses light detection via a wearable hand device 102 to wirelessly control a remote device 106. At step 302, the processing circuitry of the single board computer 116 detects if light is present. The presence of light is detected through the reception of light via the LDRs 110 and 111. The processing circuitry detects if light is present at each LDR 110 and 111. The light detected can include light emitted by the LEDs 108 and 109 as well as ambient light.

At step 304, a determination is made of whether ambient light is present. The presence of ambient light can result in a false positive light detection and therefore must be considered accordingly. A false positive in the integer value determination process 300 may indicate that ambient light is present but the light emitted by the LEDs 108 and 109 is not. As such, if ambient light is detected by the processing circuitry, resulting in a "yes" at step 304, the integer value determination process 300 will proceed to step 306. Otherwise, if ambient light is not detected by the processing circuitry, resulting in a "no" at step 306, the light detection process will proceed to step 308.

At step 306, the ambient light is filtered out of the light signal. The ambient light can be filtered by a signal conditioning circuit 114. The signal conditioning circuit is located in the wearable hand device 102 and optimizes the light signal corresponding to the presence of light received by the LDRs 110 and 111. As such, the signal conditioning circuit 114 can be configured to filter out ambient light signals received by the LDRs 110 and 111. The signal conditioning circuit 114 can include a coupling capacitor, a rectifying diode, a filtering capacitor and a Schmitt Trigger. The coupling capacitor removes the undesirable ambient light from the light received by the LDRs 110 and 111. The rectifying diode is used with the filtering capacitor to further smooth and filter the light signal corresponding to the light received by the LDRs 110 and 111. The Schmitt Trigger further removes noise from the light signal as well as converts the light signal to a low powered signal which can be read as an input by the single board computer 116.

At step 308, an integer value is determined by the processing circuitry. The integer value corresponds to the presence of light emitted by the LEDs 108 and 109 and received by the LDRs 110 and 111. The processing circuitry can be configured to determine an integer value corresponding to the detection of light emitted by the LED 108 and 109. For example, in a wearable hand device 102 with a first LED-LDR pair and a second LED-LDR pair, the processing circuitry can be configured to determine an integer equivalent of "0" if no light is detected at the two LED-LDR pairs, an integer equivalent of "1" if light is detected at the first LED-LDR pair and light is not detected at the second LED-LDR pair, an integer equivalent of "2" if light is not detected at the first LED-LDR pair but light is detected at the second LED-LDR pair, and an integer equivalent of "3" if light is detected at both the first LED-LDR pair and the second LED-LDR pair. As such, there are four possible integer values when two LED-LDR pairs are utilized by a wearable hand device 102.

At step 310, the processing circuitry is configured to transmit the determined integer values to the remote device 106 via the network 104. In certain embodiments, the remote device 106 receives the integer value from the processing circuitry, translates the integer values into commands, and performs actions at the remote device 106 corresponding to the commands. For example, the processing circuitry can determine an integer value of "1" when light emitted by the LED 108 is detected at the LDR 110. The integer value of "1" is transmitted to the remote device 106 via the network 104. The integer value "1" is translated by the remote device 106 into a corresponding command, which actuates the remote device 106 to perform an action. The wearable embedded control system 100 includes a wearable hand device 102 that controls a remote device 106 via a network 104. The wearable hand device 102 utilizes hand gestures as an input through the detection of light emitted by LEDs 108 and 109 located at the wearable hand device 102. The detection of light by processing circuitry located at the wearable hand device 102 is transmitted via the network 104 to actuate the remote device 106. The wearable hand device 102 is light and portable, increasing the productivity of users. The wearable embedded control system 100 is simple to setup and install, relying on slight training costs and minimal margins for error. The wearable embedded control system 100 is easy to maintain, consumes low energy, and designed to function in noisy environments.

Figure 4:
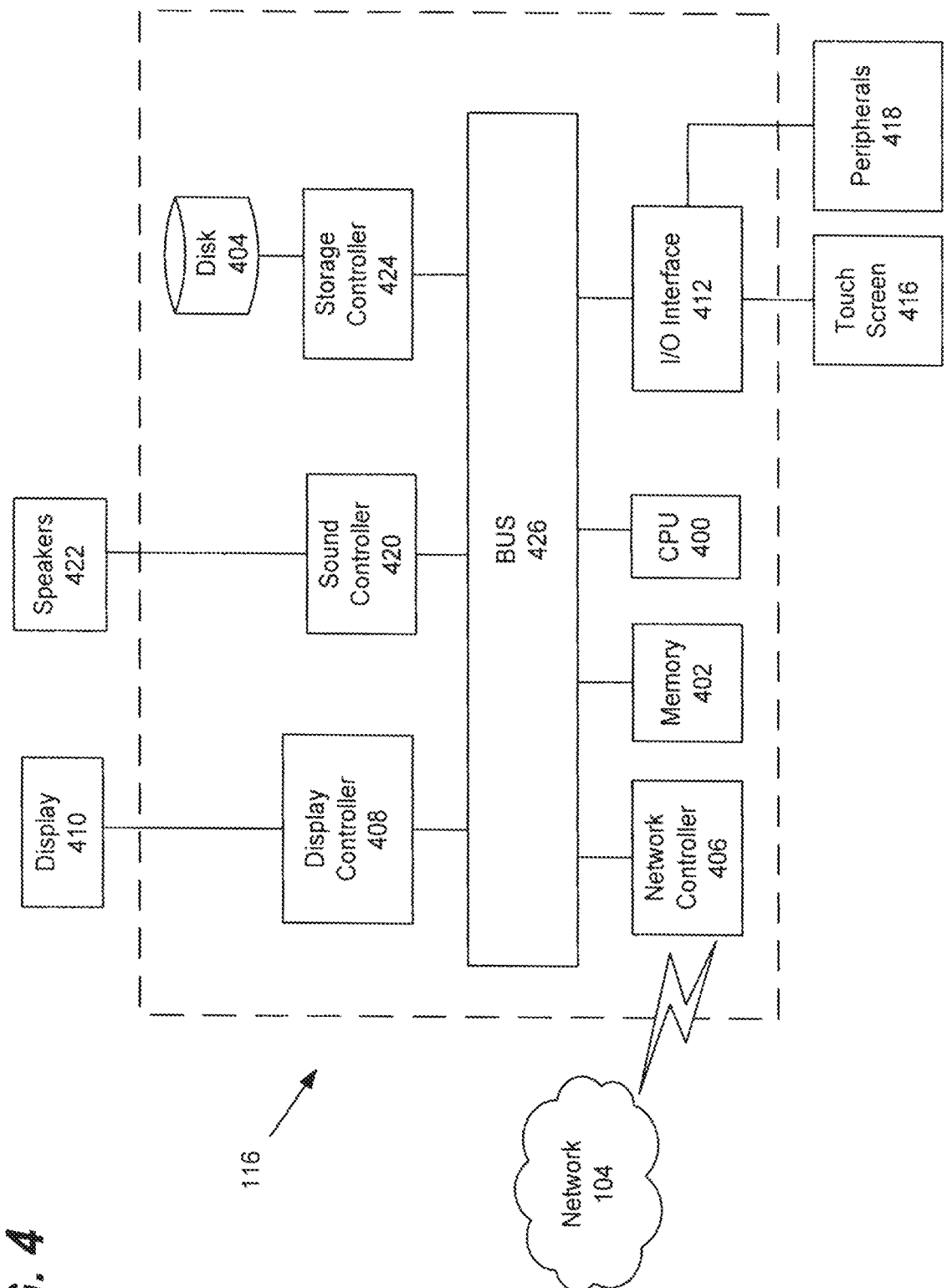
FIG. 4 illustrates a hardware block diagram of a single board computer, according to certain embodiments.
Figure 5:
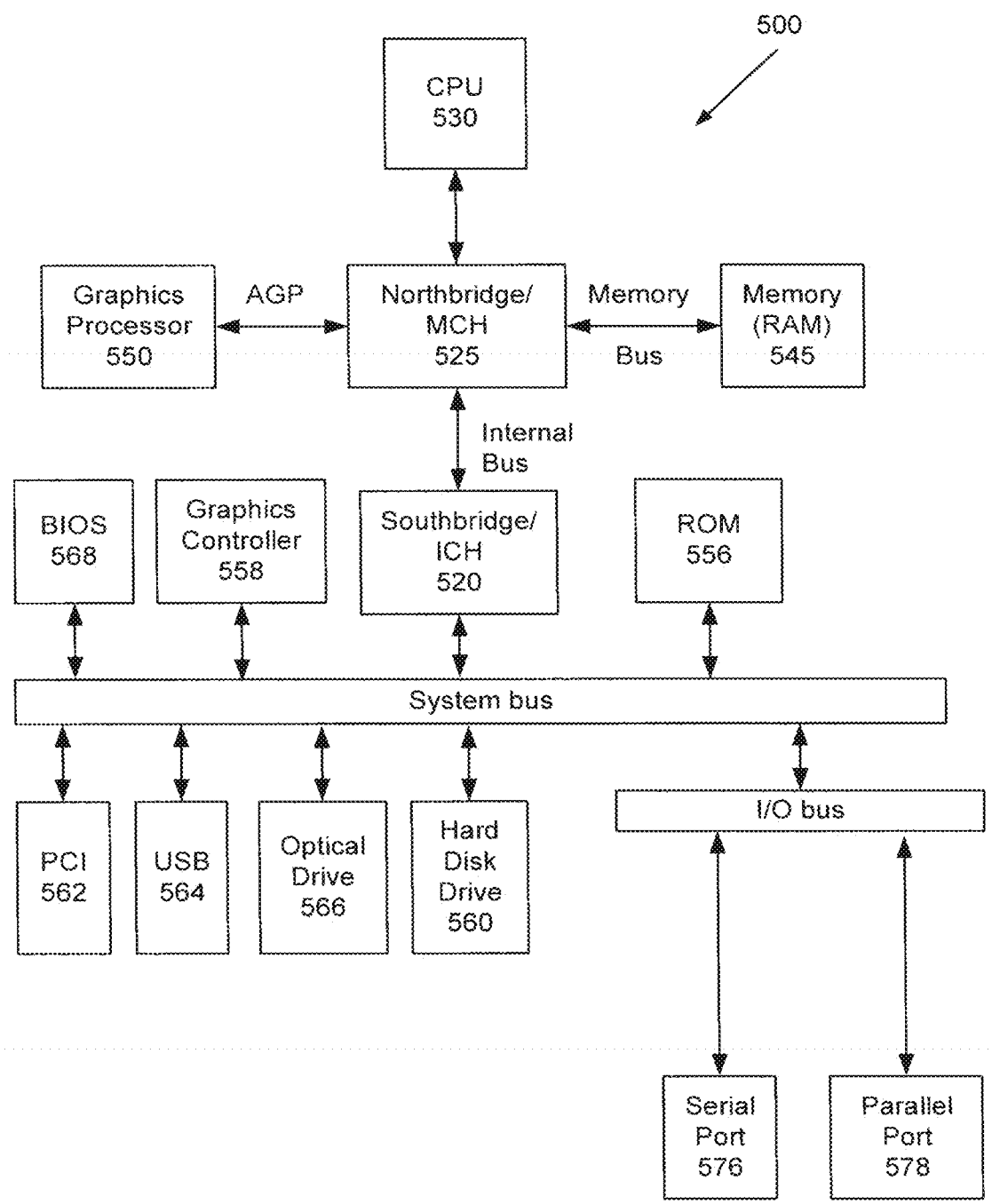
FIG. 5 illustrates a hardware block diagram of a data processing system, according to certain embodiments.

FIG. 4 illustrates a hardware block diagram of a single board computer, according to certain embodiments. In FIG. 5, the single board computer 116 includes a CPU 400 which performs the processes described above/below. The process data and instructions may be stored in memory 402. These processes and instructions may also be stored on a storage medium disk 404 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the single board computer 116 communicates, such as a remote device 106.

Further, the claimed advancements may be provided as a utility application, background daemon, or component of an operating system, or combination thereof, executing in conjunction with CPU 400 and an operating system such as Microsoft Windows 7, UNIX, Solaris, LINUX, Apple MAC-OS and other systems known to those skilled in the art.

The hardware elements in order to achieve the single board computer 116 may be realized by various circuitry elements, known to those skilled in the art. For example, CPU 400 may be a Xenon or Core processor from Intel of America or an Opteron processor from AMD of America, or may be other processor types that would be recognized by one of ordinary skill in the art. Alternatively, the CPU 400 may be implemented on an FPGA, ASIC, PLD or using discrete logic circuits, as one of ordinary skill in the art would recognize. Further, CPU 400 may be implemented as multiple processors cooperatively working in parallel to perform the instructions of the inventive processes described above.

The single board computer 116 in FIG. 4 also includes a network controller 406, such as an Intel Ethernet PRO network interface card from Intel Corporation of America, for interfacing with network 104. As can be appreciated, the network 104 can be a public network, such as the Internet, or a private network such as an LAN or WAN network, or any combination thereof and can also include PSTN or ISDN sub-networks. The network 104 can be wireless such as a cellular network including EDGE, 3G and 4G wireless cellular systems. The wireless network 104 can also be Wi-Fi, Bluetooth, or any other wireless form of communication that is known.

The single board computer 116 further includes a display controller 408, such as a NVIDIA GeForce GTX or Quadro graphics adaptor from NVIDIA Corporation of America for interfacing with display 410, such as a Hewlett Packard HPL2445w LCD monitor. A general purpose I/O interface 412 interfaces with a touch screen panel 416 on or separate from display 410. General purpose I/O interface also connects to a variety of peripherals 418 including printers and scanners, such as an OfficeJet or DeskJet from Hewlett Packard.

A sound controller 420 is also provided in the single board computer 116, such as Sound Blaster X-Fi Titanium from Creative, to interface with speakers/microphone 422 thereby providing sounds and/or music.

The general purpose storage controller 424 connects the storage medium disk 404 with communication bus 426, which may be an ISA, EISA, VESA, PCI, or similar, for interconnecting all of the components of the single board computer 116. A description of the general features and functionality of the display 410, as well as the display controller 408, storage controller 424, network controller 406, sound controller 420, and general purpose I/O interface 412 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 5.

FIG. 5 illustrates a hardware block diagram of a data processing system 500, according to certain embodiments. The data processing system 500 is embedded in a wearable hand device 102 and performs control of a remote device 116. The data processing system 500 is an example of a computer in which code or instructions implementing the processes of the illustrative embodiments may be located.

In FIG. 5, the data processing system 500 employs a hub architecture including a north bridge and memory controller hub (NB/MCH) 525 and a south bridge and input/output (I/O) controller hub (SB/ICH) 520. The central processing unit (CPU) 530 is connected to NB/MCH 525. The NB/MCH 525 also connects to the memory 545 via a memory bus, and connects to the graphics processor 550 via an accelerated graphics port (AGP). The NB/MCH 525 also connects to the SB/ICH 520 via an internal bus (e.g., a unified media interface or a direct media interface). The CPU Processing unit 530 may contain one or more processors and even may be implemented using one or more heterogeneous processor systems.

Figure 6:
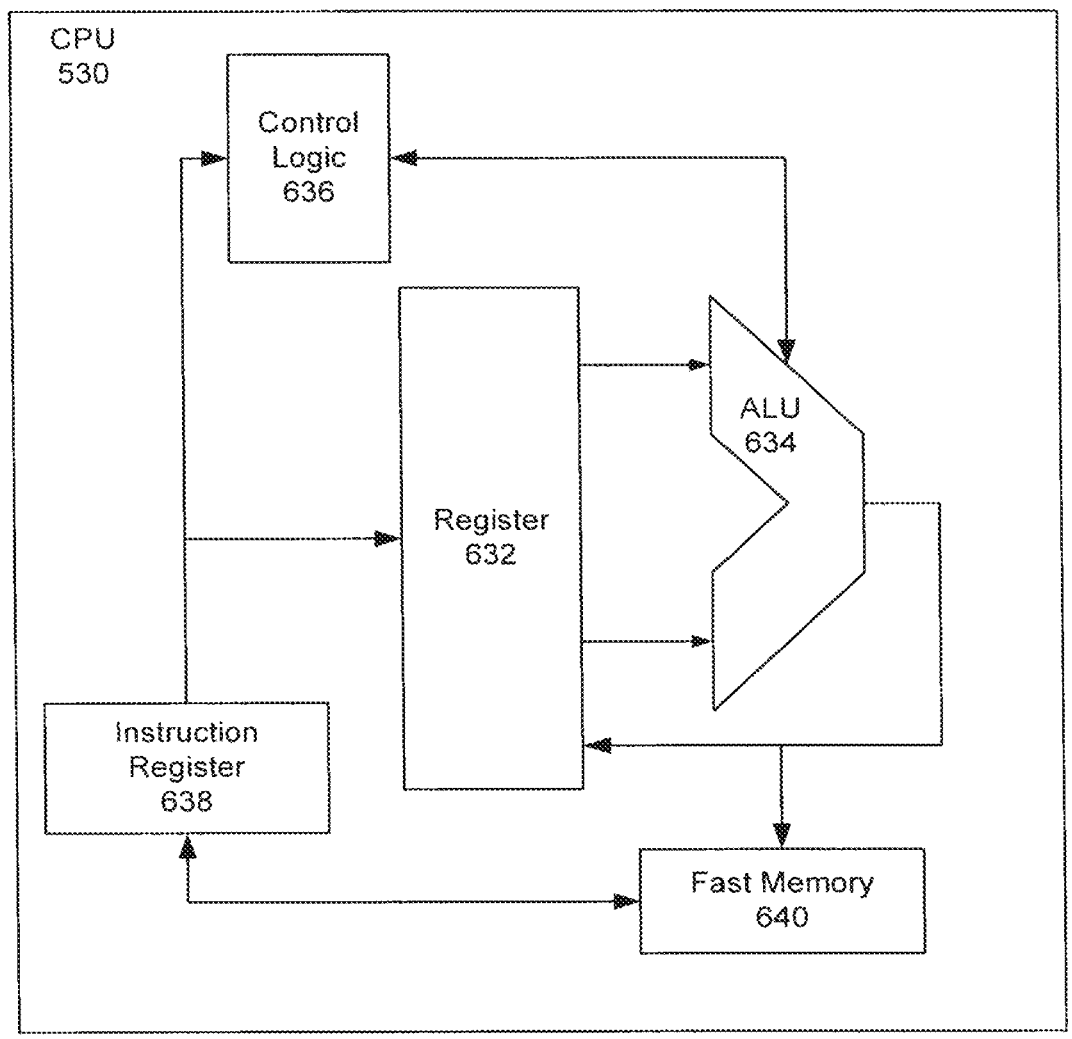
FIG. 6 illustrates a hardware block diagram of a CPU, according to certain embodiments.

FIG. 6 illustrates a hardware block diagram of a CPU, according to certain embodiments. For example, FIG. 6 shows one implementation of CPU 530. In one implementation, the instruction register 638 retrieves instructions from the fast memory 640. At least part of these instructions are fetched from the instruction register 638 by the control logic 636 and interpreted according to the instruction set architecture of the CPU 530. Part of the instructions can also be directed to the register 632. In one implementation the instructions are decoded according to a hardwired method, and in another implementation the instructions are decoded according a microprogram that translates instructions into sets of CPU configuration signals that are applied sequentially over multiple clock pulses. After fetching and decoding the instructions, the instructions are executed using the arithmetic logic unit (ALU) 634 that loads values from the register 632 and performs logical and mathematical operations on the loaded values according to the instructions. The results from these operations can be feedback into the register and/or stored in the fast memory 640. According to certain implementations, the instruction set architecture of the CPU 530 can use a reduced instruction set architecture, a complex instruction set architecture, a vector processor architecture, a very large instruction word architecture. Furthermore, the CPU 530 can be based on the Von Neumann model or the Harvard model. The CPU 530 can be a digital signal processor, an FPGA, an ASIC, a PLA, a PLD, or a CPLD. Further, the CPU 530 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 5, the data processing system 500 can include that the SB/ICH 520 is coupled through a system bus to an I/O Bus, a read only memory (ROM) 556, universal serial bus (USB) port 564, a flash binary input/output system (BIOS) 568, and a graphics controller 558. PCI/PCIe devices can also be coupled to SB/ICH YYY through a PCI bus 562.

The PCI devices may include, for example, Ethernet adapters, add-in cards, and PC cards for notebook computers. The Hard disk drive 560 and optical drive 566 can use, for example, an integrated drive electronics (IDE) or serial advanced technology attachment (SATA) interface. In one implementation the I/O bus can include a super I/O (SIO) device.

Further, the hard disk drive (HDD) 560 and optical drive 566 can also be coupled to the SB/ICH 520 through a system bus. Other peripherals and devices that can be connected to the SB/ICH 520 using a mass storage controller such as SATA or PATA, an Ethernet port, an ISA bus, a LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry, or based on the requirements of the intended back-up load to be powered.

The above-described hardware description is a non-limiting example of corresponding structure for performing the functionality described herein.

A number of implementations have been described. Nevertheless, it will be understood that various modifications may be made without departing from the spirit and scope of this disclosure. For example, preferable results may be achieved if the steps of the disclosed techniques were performed in a different sequence, if components in the disclosed systems were combined in a different manner, or if the components were replaced or supplemented by other components. The functions, processes and algorithms described herein may be performed in hardware or software executed by hardware, including computer processors and/or programmable circuits configured to execute program code and/or computer instructions to execute the functions, processes and algorithms described herein.

Additionally, an implementation may be performed on modules or hardware not identical to those described. Accordingly, other implementations are within the scope that may be claimed.

The above disclosure also encompasses the aspects listed below.

(1) A wearable embedded control system, including: at least one remote device; and at least one wearable hand device including: a plurality of light emitting diodes and a plurality of light dependent resistors coupled to the plurality of light emitting diodes wherein the plurality of light emitting diodes and the plurality of light dependent resistors are fixed along the length of the at least one finger of the at least one wearable hand device, a signal conditioning circuit configured to filter an ambient light signal, and a single board computer including processing circuitry configured to: detect a presence of light emitted by the plurality of light emitting diodes and received by the plurality of light dependent resistors, determine one or more integer values corresponding to the presence of light received by the plurality of light dependent resistors, and transmit the one or more integer values to the at least one remote device via a real-time Data Distribution Service middleware.

(2) The wearable embedded control system of (1), wherein a first light emitting diode of the plurality of light emitting diodes is located at the distal end of the at least one finger and a second light emitting diode of the plurality of light emitting diodes is located at the proximal end of the at least one finger.

(3) The wearable embedded control system of either (1) or (2), wherein a first light dependent resistor of the plurality of light dependent resistors is coupled to the first light emitting diode and a second light dependent resistor of the plurality of light dependent resistors is coupled to the second light emitting diode such that the first and second light dependent resistors are located at the middle of the at least one finger between the first light emitting diode and the second light emitting diode along the length of the at least one finger.

(4) The wearable embedded control system of any one of (1) to (3), wherein the signal conditioning circuit includes at least one capacitor, at least one diode, at least one filtering capacitor and at least one Schmitt Trigger.

(5) The wearable embedded control system of any one of (1) to (4), wherein the processing circuitry is further configured to: determine one or more commands to directly actuate the at least one remote device based on the one or more integer values; and transmit the one or more commands to the at least one remote device via a real-time Data Distribution Service middleware.

(6) The wearable embedded control system of any one of (1) to (5), wherein the single board computer further includes memory configured to store the one or more integer values and the one or more commands.

(7) The wearable embedded control system of any one of (1) to (6), wherein the processing circuitry is configured to communicated with the at least one remote device via at least one of Bluetooth, Wi-Fi and cellular networks.

(8) A wearable hand device, including: a plurality of light emitting diodes and a plurality of light dependent resistors coupled to the plurality of light emitting diodes wherein the plurality of light emitting diodes and the plurality of light dependent resistors are fixed along the length of the at least one finger of the at least one wearable hand device; a signal conditioning circuit configured to filter an ambient light signal; and a single board computer including processing circuitry configured to: detect a presence of light emitted by the plurality of light emitting diodes and received by the plurality of light dependent resistors, determine one or more integer values corresponding to the presence of light received by the plurality of light dependent resistors, and transmit the one or more integer values to at least one remote device via a real-time Data Distribution Service middleware.

(9) The wearable hand device of (8), wherein a first light emitting diode of the plurality of light emitting diodes is located at the distal end of the at least one finger and a second light emitting diode of the plurality of light emitting diodes is located at the proximal end of the at least one finger.

(10) The wearable hand device of either (8) or (9), wherein a first light dependent resistor of the plurality of light dependent resistors is coupled to the first light emitting diode and a second light dependent resistor of the plurality of light dependent resistors is coupled to the second light emitting diodes such that the first and second light dependent resistors are located at the middle of the at least one finger between the first light emitting diode and the second light emitting diode along the length of the at least one finger.

(11) The wearable hand device of any one of (8) to (10), wherein the signal conditioning circuit includes at least one capacitor, at least one diode, at least one filtering capacitor and at least one Schmitt trigger.

(12) The wearable hand device of any one of (8) to (11), wherein the processing circuitry is further configured to: determine one or more commands to directly actuate the at least one remote device based on the one or more integer values; and transmit the one or more commands to the at least one remote device via a real-time Data Distribution Service middleware.

(13) The wearable hand device of any one of (8) to (12), wherein the single board computer further includes memory configured to store the one or more integer values and the one or more commands.

(14) The wearable hand device of any one of (8) to (13), wherein the processing circuitry is further configured to communicate with the at least one remote device via at least one of Bluetooth, Wi-Fi and cellular networks.

(15) A method of embedded control, including: detecting, via the processing circuitry of a single board computer embedded in at least one wearable hand device, a presence of light emitted by a plurality of light emitting diodes and received by a plurality of light dependent resistors; determining, via the processing circuitry, one or more integer values corresponding to the presence of light received by the plurality of light dependent resistors; and transmitting, via the processing circuitry, the one or more integer values to at least one remote device via a real-time Data Distribution Service middleware.

(16) The method of (15), wherein a first light emitting diode of the plurality of light emitting diodes is located at the distal end of the at least one finger and a second light emitting diode of the plurality of light emitting diodes is located at the proximal end of the at least one finger.

(17) The method of either (15) or (16), wherein a first light dependent resistor of the plurality of light dependent resistors is coupled to the first light emitting diode and a second light dependent resistor of the plurality of light dependent resistors are located at the middle of the at least one finger between the first light emitting diode and the second light emitting diode along the length of the at least one finger.

(18) The method of any one of (15) to (17), further including: determining, via the processing circuitry, one or more commands to directly actuate the at least one remote device based on the one or more integer values; and transmitting, via the processing circuitry, the one or more commands via a real-time Data Distribution Service middleware.

(19) The method of any one of (15) to (18), wherein the single board computer further includes memory configured to store the one or more integer values and the one or more commands.

The invention claimed is:
1. A wearable embedded control system, comprising:
   at least one remote device; and
   at least one wearable hand device in the form of a glove, including:
      a plurality of fingers,
      a palm portion,
      a back of hand portion, and
      a plurality of light emitting diodes and a plurality of light dependent resistors coupled to the plurality of light emitting diodes wherein the plurality of light emitting diodes and the plurality of light dependent resistors are fixed along at least one finger of the glove, each of the light emitting diodes and a corresponding light dependent resistor being housed in a cylindrical container, a signal conditioning circuit configured to filter an ambient light signal, and a single board computer including processing circuitry configured to:
- pulse the plurality of light emitting diodes at a predetermined frequency to isolate emission from the plurality of light emitting diodes to predetermined points in time to filter the emission from the plurality of light emitting diodes from the ambient light,
- detect a presence of light emitted by the plurality of light emitting diodes and received by the plurality of light dependent resistors,
- determine one or more integer values corresponding to the presence of light received by the plurality of light dependent resistors, and
- transmit the one or more integer values to the at least one remote device via a real-time Data Distribution Service middleware, wherein the predetermined frequency is a variable switching frequency as a function of a time of day, an amount of ambient light present, and a total number of light emitting diodes.

2. The wearable embedded control system of claim 1, wherein a first light emitting diode of the plurality of light emitting diodes is located at the distal end of the at least one finger and a second light emitting diode of the plurality of light emitting diodes is located at the proximal end of the at least one finger.

3. The wearable embedded control system of claim 2, wherein a first light dependent resistor of the plurality of light dependent resistors is coupled to the first light emitting diode and a second light dependent resistor of the plurality of light dependent resistors is coupled to the second light emitting diode such that the first and second light dependent resistors are located at the middle of the at least one finger between the first light emitting diode and the second light emitting diode along the length of the at least one finger.

4. The wearable embedded control system of claim 1, wherein the signal conditioning circuit includes at least one capacitor, at least one diode, at least one filtering capacitor and at least one Schmitt Trigger.

5. The wearable embedded control system of claim 1, wherein the processing circuitry is further configured to:
- determine one or more commands to directly actuate the at least one remote device based on the one or more integer values; and
- transmit the one or more commands to the at least one remote device via the real-time Data Distribution Service middleware.

6. The wearable embedded control system of claim 5, wherein the single board computer further includes memory configured to store the one or more integer values and the one or more commands.

7. The wearable embedded control system of claim 1, wherein the processing circuitry is configured to communicate with the at least one remote device via at least one of Bluetooth, Wi-Fi and cellular networks.

* * * * *